Jan. 1, 1957     C. J. STALEGO     2,775,850
APPARATUS FOR FORMING MINERAL FIBERS
Filed March 2, 1953     2 Sheets-Sheet 2
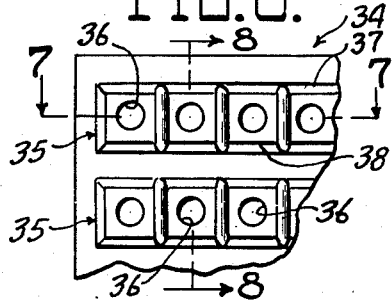
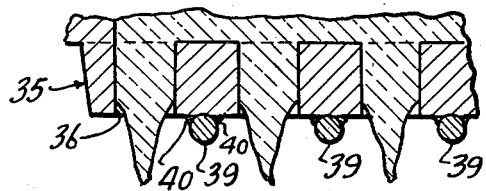
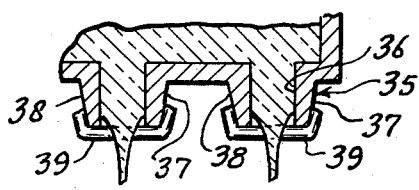
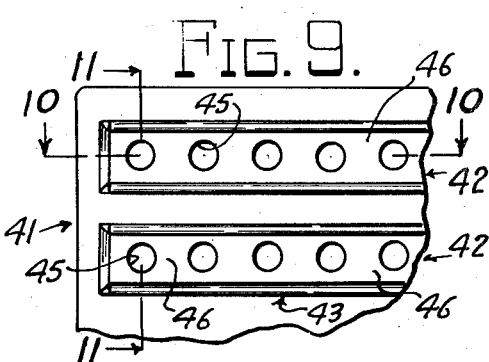
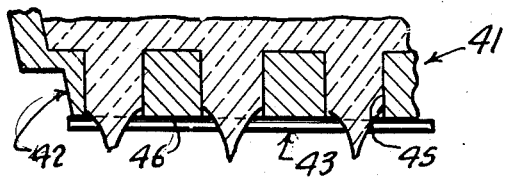
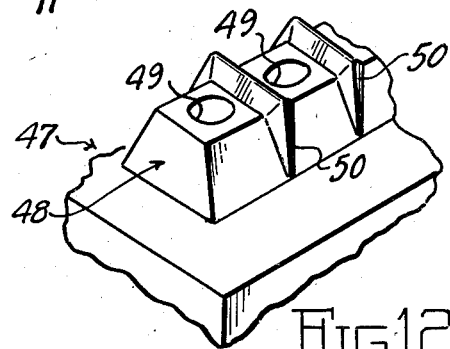
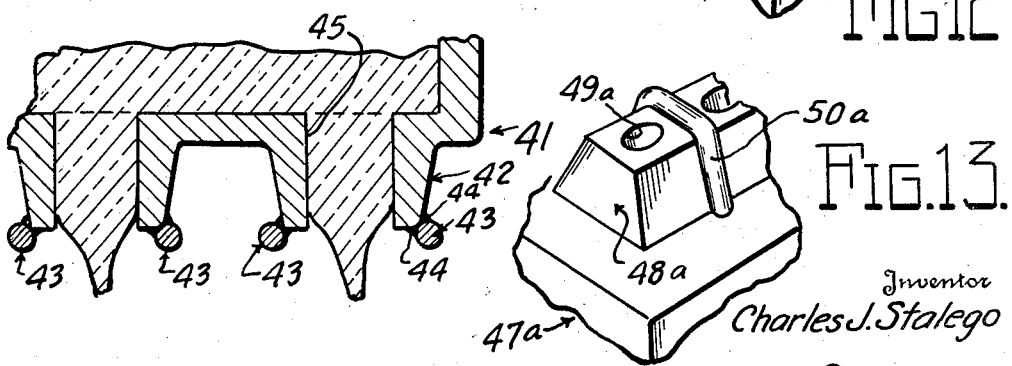
Inventor
Charles J. Stalego United States Patent Office
2,775,850
Patented Jan. 1, 1957

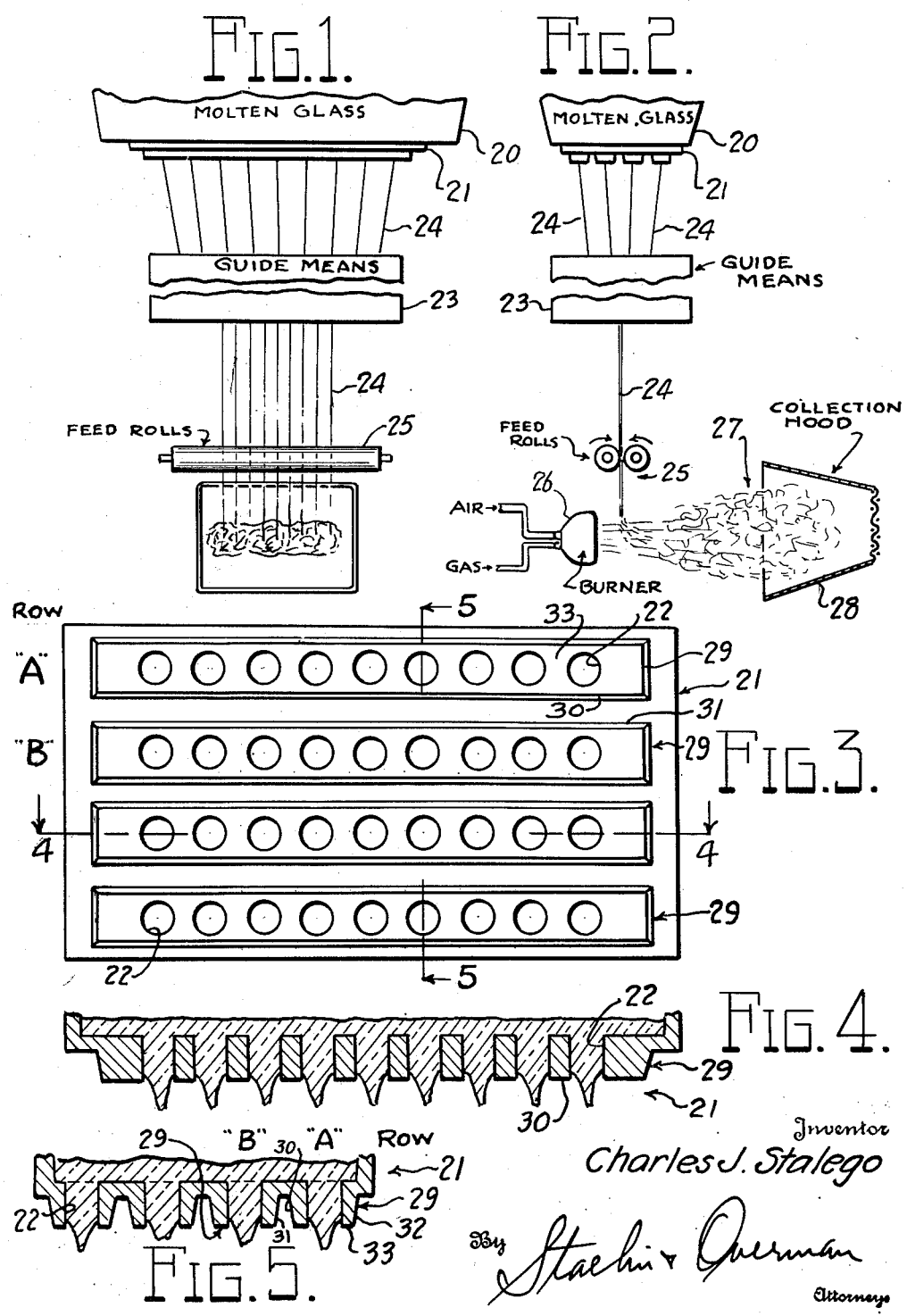

2,775,850
APPARATUS FOR FORMING MINERAL FIBERS

Charles J. Stalego, Newark, Ohio, assignor to Owens-Corning Fiberglas Corporation, a corporation of Delaware Application March 2, 1953, Serial No. 339,705

1 Claim. (Cl. 49—55)

This invention relates to apparatus for the continuous formation of relatively large diameter mineral fibers and, more particularly, to improvements in structures in which fiber forming orifices are bored, drilled, or otherwise formed.

In certain manufacturing processes where mineral fibers are treated, as for example in processes for the formation of fine insulating wool such as glass wool, it is first necessary to form molten glass into individual fibers of controlled, relatively large diameter, say, in the order of 0.13". The formation of such large diameter fibers on a continuous basis has been accomplished by providing a pool of molten glass in a container having a plurality of orifices drilled or bored in its lower surface and allowing the molten glass to pour through the orifices. As the glass pouring through each orifice congeals it is mechanically drawn to attenuate the stream into an individual fiber. By careful control of the temperature of the molten glass, its constituents, and the speed at which the fiber is drawn, it is possible to continuously draw a fiber having a close tolerance in its diameter from an orifice of specific diameter.

Where the individual fibers are finally to have a diameter in the order of .013", the orifices forming the streams from which the fibers are pulled must have diameters substantially larger than the diameters of the finished fibers, say in the order of .240". Because the glass streaming through the orifices is in a highly fluid condition and at high temperature has a tendency to "wet" the material in which the orifices are formed, it tends to flow over the bottom surfaces surrounding the orifices until the glass flowing away from one orifice contacts glass flowing from an adjacent orifice and floods the bottom surface through which the orifices extend. As soon as flooding occurs the distinctness of each stream is destroyed and instead of two streams pouring from two adjacent orifices, there then exists but one stream which pours from the flooded area of molten glass between the orifices. Thus, if the orifices are placed too close to each other the entire undersurface of such an apparatus may be flooded by molten glass moving laterally from the individual orifices.

It is, therefore, the principal object of this invention to provide an orifice element for the bottom of a molten glass supply tank which will inhibit the tendency of the molten glass to flood laterally from its orifices and which will in some of the more refined forms positively prevent such lateral flooding.

This object and its mode of achievement will be better understood from the drawings, in which:

Fig. 1 is a somewhat diagrammatic view in elevation showing apparatus for the formation of primary fibers of larger diameters and for their subsequent treatment.

Fig. 2 is a view similar to Fig. 1 but taken from the side of Fig. 1.

Fig. 3 is a greatly enlarged bottom view of an orifice element for a molten glass tank fabricated according to the invention.

Fig. 4 is a fragmentary vertical sectional view taken substantially on the line 4—4 of Fig. 3.

Fig. 5 is a fragmentary vertical sectional view taken substantially on the line 5—5 of Fig. 3.

Fig. 6 is a fragmentary bottom view of a portion of an orifice element embodying a modification of the invention.

Fig. 7 is an enlarged vertical sectional view taken on the line 7—7 of Fig. 6.

Fig. 8 is a fragmentary vertical sectional view taken on the line 8—8 of Fig. 6.

Fig. 9 is a view similar to Fig. 6 but of a further modification of the invention.

Fig. 10 is a fragmentary vertical sectional view taken on the line 10—10 of Fig. 9.

Fig. 11 is a still further enlarged fragmentary vertical sectional view taken on the line 11—11 of Fig. 9.

Fig. 12 is a fragmentary view in bottom perspective of a portion of an orifice element embodying still another modification of the invention.

Fig. 13 is a view similar to Fig. 12 but of a still further modified embodiment of the invention.

In the apparatus of Figs. 1 and 2 there is provided a molten glass tank 20, which may be part of a melting apparatus or merely may be a tank into which molten glass is poured from other apparatus. The tank 20 preferably is heated as, for example, by the passage of electrical current through its metal walls in order to control the temperature of the glass therein. The tank 20 has an orifice element 21 which forms the bottom of the tank. The orifice element 21 (Fig. 3) has a plurality of orifices 22 drilled or otherwise formed therein which lead from the interior of the tank 20 above the element 21 to the atmosphere below the tank 20. When the glass in the tank 20 reaches the proper temperature it flows through each of the orifices 22 in a stream which tends to form a generally inverted cone shaped point of molten glass beneath each orifice 22. In Fig. 4 it will be observed how the glass flows downwardly from each of the orifices 22.

By means not constituting a part of the instant invention, for example by means of a small wire hook, an operator engages the end of each of the streams as it pours through its orifice 22 and draws the glass downwardly through a guide means 23 which directs the plurality of individual fibers 24 thus formed into parallelism with the other fibers. The group of parallel fibers 24 are then led downwardly between a pair of feed rollers 25 which are rotated toward each other as shown in Fig. 2 to feed the fibers 24 downwardly.

The fibers 24 in the apparatus of Figs. 1 and 2 are then fed downwardly and across the face of a burner 26 which blasts its flame across the line of movement of the fibers 24. The speed of propagation of the flame of the burner 26 is extremely high and the intensity of the heat, combined with the blast or jet action of the burner, shreds the fibers 24 into a mass of fine curly fibers indicated at 27. The fibrous mass 27 may be collected as, for example, by a collection hood 28. Such a mass has great utility as insulation, flotation material, filtering material and similar uses.

The orifice element 21 as shown in bottom plan view in Fig. 3 is cast with a plurality of parallel elongated ridges 29. This achieves spacing between orifices 22 in row A and row B, for example, and provides for a substantial area of heat radiation. Reference to Fig. 5 illustrates how a vertical wall 30 of the ridges 29 of row A and a vertical wall 31 of the ridges 29 of row B both are available for dissipating heat from the glass passing through their respective orifices 22. Because of these substantial radiating surfaces 30 and 31 and because of the similar surfaces 32 on the exterior of the ridges 29 of row A and the opposite side of the ridge 29 of row B, sufficient heat is lost from the metal forming the ridges 29 so as to cool the bottom 33 of the ridge 29, thus inhibiting the tendency of the molten glass to flood horizontally over the bottom surface of the ridge 29.

The cooling afforded by the two sides 32 and 30 of the ridge 29 of row A for example, not only eliminates flooding laterally from the orifice 22 but it is sufficient to prevent flooding longitudinally of the ridge 29 under most operating conditions.

Under more difficult operating conditions as, for example, when it is not practicable to exercise close temperature control or where transient air currents may disturb the balance of temperature between the surfaces 32, 30 and 33 of, for example, the ridge 29 forming the row A, glass may still flood over the bottom surface 33 of the ridge 29 longitudinally along the ridge. The modifications of the invention illustrated in Figs. 6–13, inclusive, are, therefore, designed to increase the radiation surfaces of the ridges 29 to further cool their bottom surfaces by heat loss from radiation and thus positively prevent flooding between adjacent ones of the orifices 22.

In Fig. 6, for example, an orifice element 34 is fragmentarily shown. The element 34 has a plurality of individual ridges 35, two of which are shown in part. Each of the ridges 35 is pierced with a series of individual fiber forming orifices 36 which are spaced from each other longitudinally along the ridges 35. The ridges 35, like the ridges 29 of Fig. 3, have vertically extending radiating surfaces 37 and 38 (Fig. 8) and, in addition, are provided with transversely extending radiator elements 39. Each of the elements 39 is illustrated in the form of a separate wire clip which is brazed or soldered, for example, at the points indicated by the reference numbers 40 in Fig. 7, transversely across one of the ridges 35 between adjacent ones of the orifices 36. Heat is conducted to the radiators 39 and radiates from their surfaces at a speed faster than the heat can be conducted downwardly into the ridges 35 from the main body of the orifice element 34. This excess radiation brought about by the greater radiating surfaces of the radiators 39 so cools the surface 35 as to positively prevent longitudinally flooding between adjacent ones of the orifices 36.

In Figs. 9, 10 and 11 a further modification of the invention is illustrated. In these figures an orifice element 41 is fragmentarily shown and is illustrated as having a plurality of parallel spaced orifice ridges 42 similar to those described with respect to the earlier figures. In this instance the longitudinal corners of the ridges 42 (see Fig. 11) are provided with longitudinally extending radiators 43. Like the transverse radiators 39, the radiators 43 of Figs. 9–11, may be formed of lengths of wire soldered or brazed to the ridges 42 at the points indicated by the reference numbers 44. In this instance orifices 45 are not spaced by radiators but have radiators extending along two lateral sides of their ridges 42. The increased radiating surface of the longitudinally extending radiator wires 43, however, is sufficient to produce the heat loss required in order to maintain surfaces 46 between the orifices 45 cool enough to prevent flooding.

The structures of Figs. 6–13 are advantageous because of the additional radiating surfaces, for examples, the radiators 39 and 43, when it is desired to raise the temperature of the molten glass in order, for example, to increase the rate of flow of the glass through the orifices.

Fig. 12 is a fragmentary view in perspective taken from the underside of a further modification of the invention in which an orifice element 47 has orifice ridges 48 (of which one is shown in fragment) provided with a plurality of longitudinally spaced orifices 49. In this embodiment of the invention transversely extending radiators 50, may, for example, be integrally cast with the material forming the ridges 48 and the surfaces of the radiators 50 may be flat as shown in Fig. 12 or they may have curved surfaces as shown on the radiators 50a in Fig. 13. Except for the specific form of the radiators 50 or 50a the embodiments of the invention illustrated in Figs. 12 and 13 are substantially identical.

Further modifications in radiators or in surfaces intended to radiate heat from the orifice element or its ridges may be designed according to the invention, the sole underlying concept being merely that sufficient surface shall be provided adjacent the orifices through which the fibers are formed so as to provide for loss of heat from the metal around the orifices at a rate faster than heat is transferred to such metal either from the glass passing through the orifices or from the metal itself; the metal surrounding the orifices thus being kept cooler than the glass streaming through the orifices. Under these conditions, where the metal is cooler than the molten glass, the glass does not flood over the surface of the metal even though it still retains its tendency to wet the metal; being inhibited by the congealing effect of the cool metal.

Although it is difficult to illustrate, it will be observed particularly in Figs. 4, 5, 7, 8, 10 and 11, that each stream of glass pouring through one of the orifices separates from the metal forming the walls of the orifice at a level above the bottom of the orifice. The cone pointed tips of glass from which the fibers are formed seem to start above the ends of the orifices through which the glass is pouring. The separation of the glass from the surface of the metal at a level above the bottoms of the orifices indicates that the metal forming the walls of the orifices is being cooled by the radiating surfaces provided by the invention sufficiently so that the glass clings to the metal only until it reaches a point where the metal is cooler than the glass.

If, on the other hand, the metal forming the orifices were not radiating heat away more rapidly than it is being conducted thereto or transferred thereto from the glass, the glass would flow down on the walls of the orifices until it reached the lower corners of the orifices and then would continue to wet or flood horizontally eventually meeting similar flooding glass from adjacent orifices.

This flooding effect thus is strenuously inhibited or completely prevented by structures constituting the subject matter of the invention.

I claim:

A fiber forming element for a glass fiber forming apparatus, said element comprising a precious metal bottom plate for a glass melter, said plate having ridges integral therewith and protruding below the body thereof, said ridges being parallel and spaced laterally from each other, each of said ridges having upwardly divergent side walls, there being a plurality of longitudinally spaced, downwardly directed orifices through said element and opening through said ridges, whereby the diverging side walls of said ridges dissipate heat from said ridges sufficiently rapidly to prevent flooding between orifices on the bottoms of said ridges and said orifices are spaced a lesser distance from each other than would be possible in an element having a planar bottom surface.

References Cited in the file of this patent

UNITED STATES PATENTS

| | | |
|---|---|---|
| 2,407,295 | Simison et al. | Sept. 10, 1946 |
| 2,460,547 | Stevens | Feb. 1, 1949 |
| 2,489,508 | Stalego | Nov. 29, 1949 |
| 2,578,986 | Schoonenberg et al. | Dec. 18, 1951 |
| 2,634,553 | Russell | Apr. 14, 1953 |